US008073745B2

(12) United States Patent
Admon

(10) Patent No.: US 8,073,745 B2
(45) Date of Patent: Dec. 6, 2011

(54) AUCTION VARIATION

(75) Inventor: Eran Admon, Tel-Aviv (IL)

(73) Assignee: Eran Admon, Herzelia (IL)

( * ) Notice: Subject to any disclaimer, the term of this patent is extended or adjusted under 35 U.S.C. 154(b) by 1334 days.

(21) Appl. No.: 10/546,265

(22) PCT Filed: Feb. 19, 2004

(86) PCT No.: PCT/IL2004/000168
§ 371 (c)(1),
(2), (4) Date: Sep. 6, 2006

(87) PCT Pub. No.: WO2004/074974
PCT Pub. Date: Sep. 2, 2004

(65) Prior Publication Data
US 2006/0287924 A1 Dec. 21, 2006

Related U.S. Application Data

(60) Provisional application No. 60/447,762, filed on Feb. 19, 2003.

(51) Int. Cl.
*G06Q 40/00* (2006.01)
(52) U.S. Cl. .................... 705/26.3; 705/26.43; 705/6.44
(58) Field of Classification Search .................... 705/37, 705/26.3
See application file for complete search history.

(56) References Cited

U.S. PATENT DOCUMENTS

| 6,260,024 | B1 | 7/2001 | Shkedy |
| 6,269,343 | B1 | 7/2001 | Pallakoff |
| 6,332,129 | B1 | 12/2001 | Walker et al. |
| 6,356,878 | B1 | 3/2002 | Walker et al. |
| 6,366,891 | B1 | 4/2002 | Feinberg |
| 6,510,418 | B1 | 1/2003 | Case et al. |
| 6,553,346 | B1 | 4/2003 | Walker et al. |
| 6,671,674 | B1 * | 12/2003 | Anderson et al. ............... 705/26 |
| 2001/0049654 | A1 * | 12/2001 | Cecchetti et al. ............... 705/38 |
| 2002/0023041 | A1 * | 2/2002 | Brett .............................. 705/37 |
| 2003/0018515 | A1 | 1/2003 | Guler et al. |
| 2003/0023537 | A1 * | 1/2003 | Joshi et al. ...................... 705/37 |
| 2003/0158804 | A1 * | 8/2003 | Francis et al. .................. 705/37 |
| 2004/0039677 | A1 * | 2/2004 | Mura et al. ...................... 705/37 |
| 2004/0128224 | A1 * | 7/2004 | Dabney et al. .................. 705/37 |
| 2006/0184384 | A1 * | 8/2006 | Chung et al. ...................... 705/1 |
| 2007/0174180 | A1 * | 7/2007 | Shin ............................... 705/37 |
| 2008/0033868 | A1 * | 2/2008 | Gologorsky et al. ........... 705/37 |
| 2008/0306865 | A1 * | 12/2008 | Evelyn et al. .................... 705/37 |

OTHER PUBLICATIONS

Carlson "Helpful Advice for Anglers and Great Bargains on Tackle", http://web.archive.org/web/20030205042542/http://www.carlsons.co.uk/,2003.
MAXPRICE System Description.
International Preliminary Report on Patentability Dated Sep. 1, 2005 From the International Bureau of WIPO Re.: Application No. PCT/IL2004/000168.

(Continued)

*Primary Examiner* — Jagdish Patel
*Assistant Examiner* — Kevin Poe
(74) *Attorney, Agent, or Firm* — Reches Patents

(57) ABSTRACT

A method of marketing items comprising: publicizing an auction to sell at least one item, accepting a preset number of price bids for the items, applying at least one cancellation rule to selectively cancel zero or more bids, selecting one or more bids closest to a preselected low sum to receive the item, wherein the low sum is less than 1% of a list price of the item.

11 Claims, 4 Drawing Sheets

OTHER PUBLICATIONS

International Search Report Dated Jan. 27, 2005 From the International Searching Authority Re.: Application No. PCT/IL04/00168.
Official Action Dated Feb. 19, 2010 From the US Patent and Trademark Office Re.: U.S. Appl. No. 10/546,265.

Response Dated Oct. 22, 2009 to Official Action of Jun. 22, 2009 From the US Patent and Trademark Office Re.: U.S. Appl. No. 10/546,265.
Written Opinion Dated Jan. 27, 2005 From the international Searching Authority Re.: Application No. PCT/IL04/00168.

* cited by examiner

200

| BUYER ID | BID $ |
|---|---|
| A | 0.01 |
| B | 0.00 |
| C | 0.02 |
| D | 0.00 |
| E | 0.01 |
| F | 0.03 |

LIST: 300

| BUYER ID | BID $ |
|---|---|
| A | 150 |
| B | 10 |
| C | 50 |
| D | 15 |
| E | 95 |

TOTAL: 320
AVERAGE: 64

FIG.3

| BUYER ID | BID $ |
|----------|---------|
| A | −235.01 |
| B | −233.32 |
| C | −235.01 |
| D | −234.25 |

AUCTION VARIATION

RELATED APPLICATIONS

The present application is a U.S. National Phase of PCT Application No. PCT/IL2004/000168, filed on Feb. 19, 2004, which claims the benefit under 35 U.S.C. §119(e) of U.S. Provisional Application No. 60/447,762, filed on Feb. 19, 2003, the disclosure of which is incorporated herein by reference.

FIELD OF THE INVENTION

The present invention relates generally to a method and apparatus for auctioning or promotion.

BACKGROUND OF THE INVENTION

Sales people are generally interested in marketing strategies, which will draw the attention of potential buyers and increase sales. The seller is interested in maximizing profit, whereas the buyers are interested in minimizing cost.

An auction is a marketing game wherein the item price is set according to the price the participants are willing to pay. Generally, the larger the audience the more likely the price will be high. Many methods of getting together large audiences without physically bringing the people together have been used over the past years. One method is by broadcasting the auction on television, for example on a sales channel and accepting bids live by telephone. A second method is by publicizing the items in a newspaper and accepting bids by telephone until a selected time. A third method is by conducting the auction on the Internet, for example as implemented by Ebay (www.ebay.com).

In some cases, the auction organizers charge a fee from the seller and/or bidder and/or charge a percentage of the closing deal to cover organization costs.

In an auction method suggested by Max Price Ltd. (www-.maxprice.co.il), the organizers charge a fee from the bidders and use some of the fee to subsidize the item price for the buyer offering the winning bid. In Max Price the buyer is offered an item at up to 20% or less of its list price. The buyer who gives the highest bid up to the maximum price (up to 20% or less of the list price) wins the item on condition that no other bidder offered the same price. Duplicate bids are canceled and do not participate.

Another auction method called the upside-down auction similarly subsidizes the item for a winning bid. In the upside-down auction the items are offered at a minimal price which is equal to the Israeli VAT (value added tax) of the item list price (17 or 18% of the list price). In the upside down auction the lowest non-duplicate bid wins the item at the bid price.

In Max Price and upside-down auction the games attempt to reduce the price for the buyer while not damaging the profit of the seller. Generally the actual sale price is very close to the maximal price of Max Price and/or the minimal price of Min Price since a difference of 100.00 in the price represents 10,000 different bid values. In most cases the number of bids allowed for an item before closing bidding on the item is less than this value, therefore the bids generally deviate only by a small percent from the selected price.

SUMMARY OF THE MENTION

An aspect of some embodiments of the invention relates to a marketing game which aims to reduce the buyers cost down to zero or to a low price. Optionally, the price bid deviations are relatively large compared to the low target price, for example greater by 100%, 1000%, 10000%, intermediate values, or more. In some embodiments of the invention, the minimal non-duplicate bid wins the item. In some embodiments of the invention, more than one item is offered for sale and multiple bids up to the number of items are not canceled. Alternatively, only identical bids of the number of items are not canceled.

In some embodiments of the invention, the buyer is paid to purchase the item. Optionally, the buyer offers a positive or negative price representing the sum he or she would like to be paid to purchase the item. Optionally, the buyer offering the minimum non-duplicate sum or the maximum non-duplicate sum up to a preselected limit (e.g. 10% of the item list price or 100% of the list price) wins the bid.

In some embodiments of the invention, the buyer offers to pay zero or any other preselected sum and bids on a differentiating characteristic, for example the size in cubic meters of a house that is offered.

Optionally, the above methods reduce the buyer's expense down to zero, without damaging the profit of the seller. In some embodiments of the invention, the buyer purchases the item for free or almost for free, excluding a minimal participation charge.

In some embodiments of the invention the number of participants in the game is limited to a set number in order to enhance the odds of each participant to win the item. Optionally, the bidding is closed after reaching the set number of participants.

In an exemplary embodiment of the invention, the buyers bid on the results of a statistical rule, which is applied to the bids after closing the auction, for example the closest bid to the average, the closest bid to 30% of the maximal bid or the closest bid to 2 times the minimal bid.

BRIEF DESCRIPTION OF THE DRAWINGS

Particular non-limiting embodiments of the invention will be described with reference to the following description of embodiments in conjunction with the figures. Identical structures, elements or parts which appear in more than one figure are preferably labeled with a same or similar number in all the figures in which they appear, in which:

FIG. 2 is a table illustrating an exemplary price bid according to an exemplary embodiment of the invention;

FIG. 3 is a table illustrating an exemplary statistical calculation bid according to an exemplary embodiment of the invention;

DETAILED DESCRIPTION OF EXEMPLARY EMBODIMENTS

Figure 1:
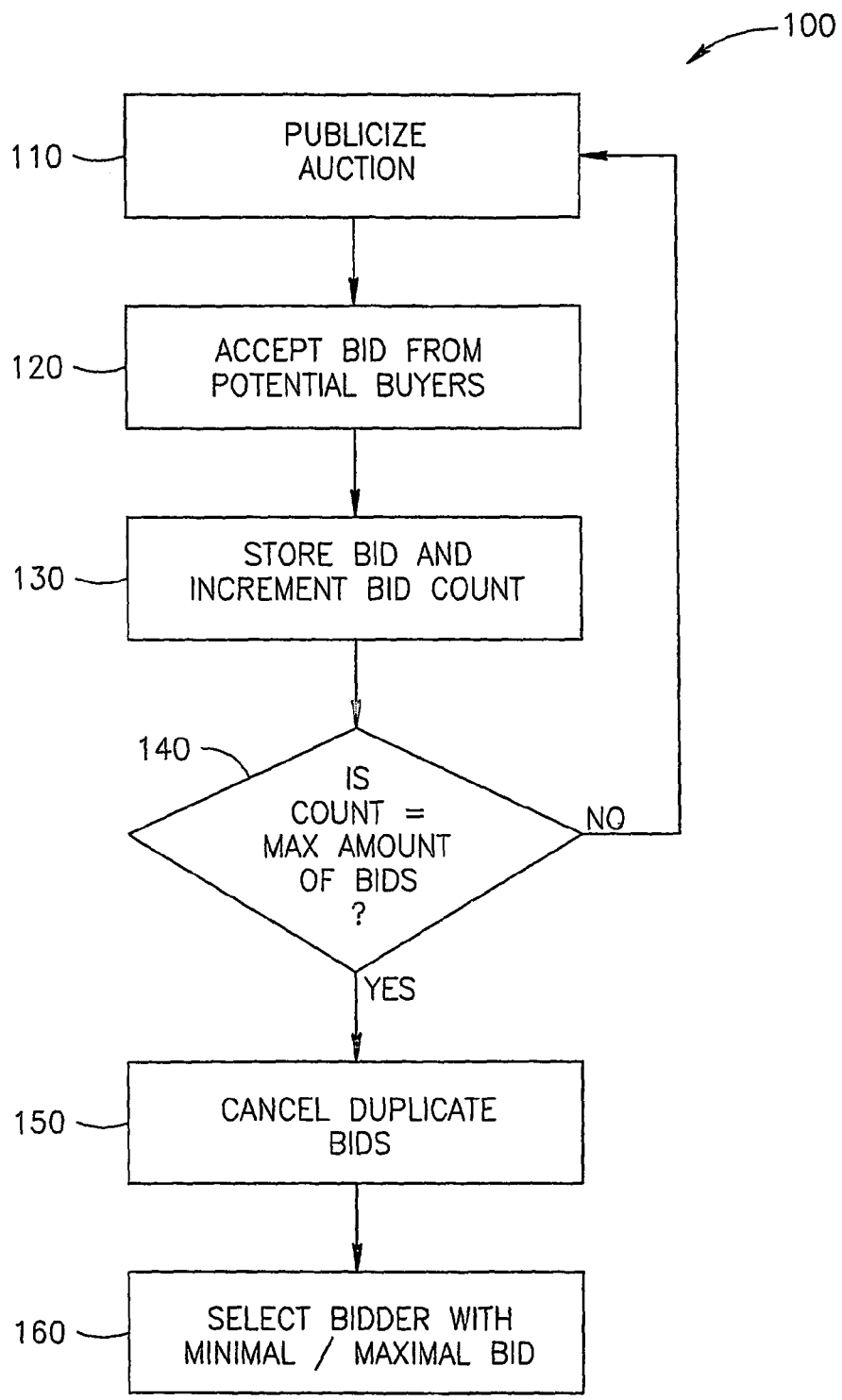
FIG. 1 is a flow diagram of the bidding process of a marketing game according to an exemplary embodiment of the invention.

FIG. 1 is a flow diagram of a bidding process of a marketing game 100 according to an exemplary embodiment of the invention. In an exemplary embodiment of the invention, a seller publicizes an item (110) to be sold using the marketing game. The publication can be by any method which can draw an audience large enough to receive from it a preset number of bids as will be described below. In an exemplary embodiment of the invention, the publication of the game can be by a non-interactive medium (e.g. a newspaper) and/or the publication can be on an interactive medium (e.g. the Internet) and other media, for example a live or not live television show. In some embodiments the publication can be a sales promotion, for example to buy a cereal or a newspaper. Optionally, a purchaser of the cereal or newspaper is allowed to participate in the auction for an item as described below, with or without paying a fee.

In 120 the potential buyers submit bids by any method supported by the seller, for example by telephone, e-mail, fax, interactive web site. Optionally, a bid is submitted with the bidders contact information in order to notify the winning bidder and/or clarify other information. Additionally, a bid is submitted with a method of payment to ensure receipt of payment of a participation fee before determining the bid winners. In some embodiments of the invention, the seller accepts more than one method of submitting a price quote and the submission method has no effect on the results of the auction. Optionally, some of the methods require receipt of a participation fee and some of the methods do not.

In an exemplary embodiment of the invention, the seller stores (130) the bids and increments a bid counter. Optionally the seller preselects a required number of bids before closing the auction for a specific item. The preselected required number of bids, is optionally selected by the seller to cover the items cost and any other associated expenses, so in contrast to some auctions, the seller does not suffer a financial loss regardless of the results of the auction.

In 140 if the preselected number of bids was not reached the seller continues waiting to accept (120) more bids. However, if the number of bids is reached the seller closes the bidding for the item by stopping to accept bids for the item.

Once the bidding for an item is closed the seller discards (150) duplicate bids such that only unique bidding values are left. The seller then selects (160) the extreme bid or bids that win the auction according to the rules of the auction as described below.

In some embodiments of the invention, the above actions are performed automatically by a software program on a computer. Alternatively or additionally, the seller performs the actions without using a computer.

In some embodiments of the invention, the winning bid is the minimum price closest to a preselected low sum such as zero as long as it is not offered by any other buyer. Optionally the low price is less than 10%, 5%, 1%, 0.75%, 0.5%, 0.25% or less of the list price. In FIG. 2 there is a table illustrating an exemplary price bid 200 wherein the closest price to zero wins the bid according to an exemplary embodiment of the invention. In the table shown in FIG. 2 there are 6 participants with buyer ID's A, B, C, D, E and F. Buyers A and E both offered an identical price of 0.01 and are therefore canceled. Likewise buyers B and D both offered an identical value of zero and are also canceled. The lowest remaining bid is bid C with a price of 0.02 who therefore wins the auction. In some embodiments of the invention, more than one unit of the item is offered for sale and the lowest bids win the auction. For example in FIG. 2 for 2 units being offered bid C and bid F would win the auction.

In some embodiments of the invention, more than one identical bid is allowed, for example according to the number of units offered for sale. In an exemplary embodiment of the invention, for two units being auctioned duplicate bids are not canceled but triplicate bids or more are. In the example in FIG. 2 the winners in such a case would be buyers B and D with a bid of zero. Alternatively or additionally, in some cases any number of bids not equal to the number of items are canceled, for example if two units are offered for sale only duplicate bids can win the auction.

In some embodiments of the invention, the winning bidder receives the item for free regardless of the winning bid. Alternatively the price is a fixed sum, for example shipping costs, regardless of the buyer's bid.

In some embodiments of the invention, the buyers offer bids on other characteristics aside from the price, for example the exact size (e.g. in cubic meters or square meters) of a house being offered or a random number. In some embodiments of the invention, the characteristic is a known value, for example the telephone number for receiving bids, or the serial number of the product. Alternatively, the number is unknown, for example the closing date and time of the auction, which is determined upon receiving the last bid from the preset number of bids.

Other examples of times or numbers associated with a bid, statistics of a bid or results of a bid, may be used, for example, a starting time of a bid (possibly known) or a time when 50% of the bids were entered (not known), or a time when a certain number of bids (e.g., 100 or 1000) is entered.

In an exemplary embodiment of the invention, the starting time of a bid is known. An effective time is "entered" by a bidder by clicking at that certain time (or by entering it). In this example, the click on a certain web page (or other window, for example a JAVA applet) that is closest to a starting time (and optionally is unique) will win. The web page may be, for example, public or it may be provided to a bidder in response to a request to bid. In another example, entering the last unique bid or entering the time of the last unique bid or entering the time of the last bid, will win.

In an exemplary embodiment of the invention, the web page is a content web page and the biding is used as a means of enticing a bidder to stay. For example, a pop-up window may come up at random times or dependent on the actions of the bidder and offer the bidder to take part in a bid.

Alternatively or additionally, the web page includes promotional material, for example, targeted to the bidder. In an exemplary embodiment of the invention, a relatively small window of time is selected for the bid (e.g., 1 minute, 5 minutes, 10 minutes, 1 hour) so that a user is likely to spend that time at the web page. This waiting time may be utilized, for example, for showing promotional material, game playing or collecting personal information. Optionally, entered personal information or answering a poll affects the bidder's chances, for example, increasing his "uniqueness" or making it possible to select that bidder from among several bidders with a same time, but with different degrees of participation.

Alternatively or additionally, responding to polls and/or entering information is a requirement for the bidder to enter a bid.

Optionally, the bidder quoting the closest value to the correct value wins. Optionally, if they are two bidders with the same value, the first one wins. Alternatively, the closest unique value wins.

In an exemplary embodiment of the invention, the bidders bid on the product supply date, for example between a minimum and maximum date. In some embodiments of the invention, the maximum non-unique date wins allowing the seller to delay supply of the item until the selected date and profit from investing the money until then.

In some embodiments of the invention, bidders offer bids on multiple characteristics and the most unique bidder wins (e.g. the bidder with the maximum difference from all other bids over all the characteristics).

In an exemplary embodiment of the invention, an auction comprises the following informational items:

(a) A publication of the auction, for example, by e-mail or at a WWW page advertisement.

(b) An identification of the type and number of items being auctioned. Optionally, a fixed number is identified.

(c) An identification of the "correct value", for example, "time of end of bid", "zero", or other values described herein.

(d) The terms of winning, for example, "the lowest unique value".

(e) Terms of joining the auction, for example, answering questions, providing a code or payment.

(f) The maximum number of bids allowed. In some cases, the maximum is a number. In others, the maximum is a function, for example, based on the rate of joining, or there may be a minimum number with a time limit and/or a maximum number set for limiting the actual number of bids.

Figure 5:
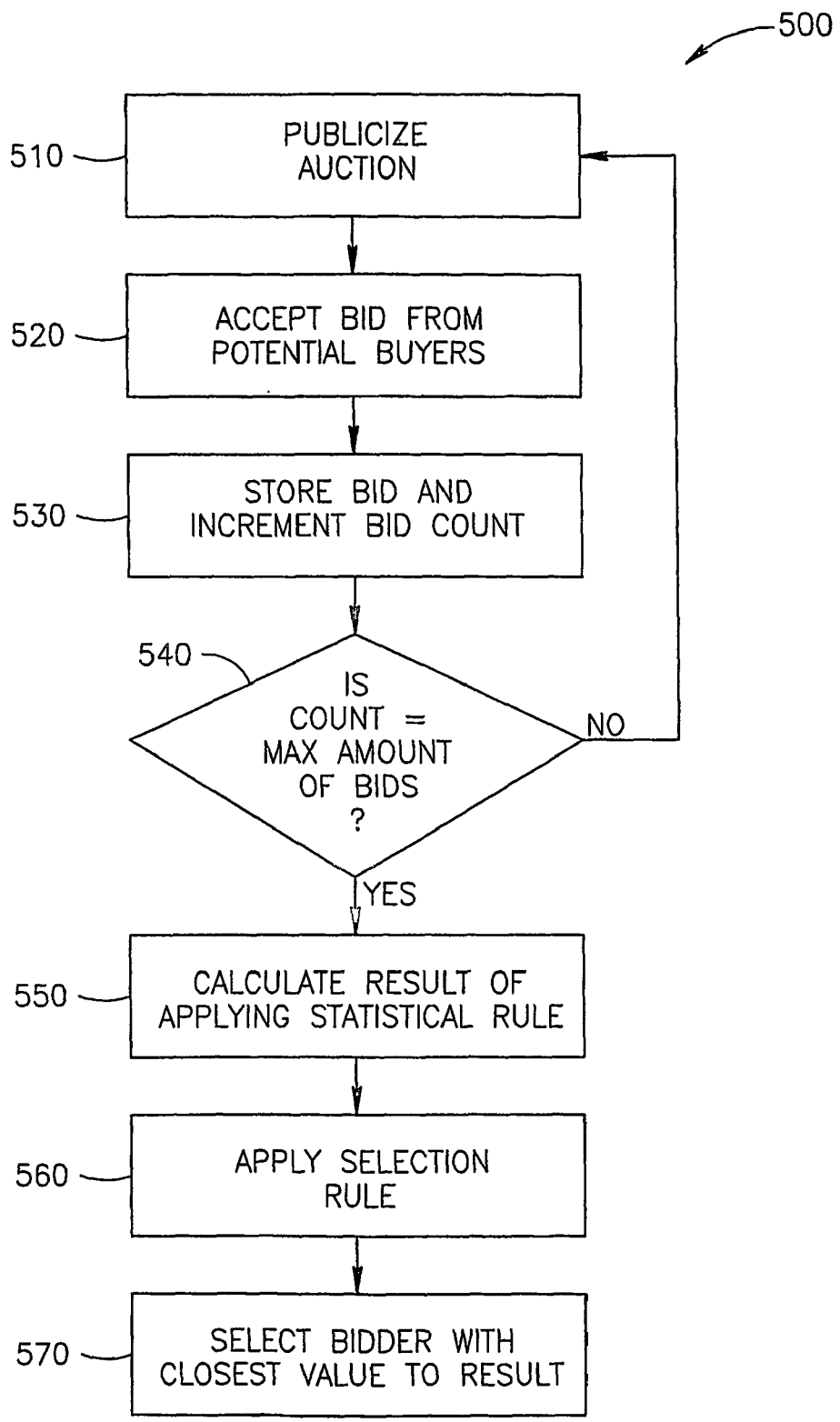
FIG. 5 is a flow diagram of the bidding process of a marketing game according to an exemplary embodiment of the invention.

In some embodiments of the invention, the winning bid is selected according to the results of a statistical rule, which is applied to the bids after closing the auction. FIG. 5 is a flow diagram 500 of the bidding process of a marketing game according to an exemplary embodiment of the invention.

In the process in FIG. 5, similar to FIG. 1 described above:
1. The auction is publicized (510).
2. Bids are accepted from potential buyers (520).
3. The bids are stored and a counter is incremented (530).
4. The counter is checked to see if the selected amount of bids have been received (540).

Differing from FIG. 1 in the embodiment illustrated in FIG. 5, a statistical calculation is applied (550) to the bids collected in (530) to produce a result dependent on the values bid by the bidders. Optionally, a selection rule is applied (560) to the result of the statistical calculation, for example the result of the statistical calculation is multiplied by a constant value or a variable (e.g. number of bids or the difference between the highest bid to lowest bid). The selection rule is optionally used to adjust the range of the calculated value to conform to the range which the seller is interested in receiving bids. In an exemplary embodiment of the invention, the closest bid to the calculated value wins the auction (570). Optionally, if two buyers offer the same bid the first to offer is selected. Alternatively or additionally, the closest unique bid fitting the statistical rule and selection rule wins.

FIG. 3. is a table illustrating an exemplary statistical calculation bid according to an exemplary embodiment of the invention. In an exemplary embodiment of the invention, the bidders A, B, C, D and E each bid a value, which they expect to be closest to the average of all the bids for the item with a list value of 300. At the end of the auction the average is calculated (e.g. 320/5=64 in FIG. 3) and the closest bid to the average wins (bid C in FIG. 3). In some embodiments of the invention, other statistical rules are used, for example the maximal bid, the minimal bid, the median of the bids, a predetermined percentile of the bids, a standard deviation of the bids, a modal value of the bids or a weighted average (e.g. earlier bids are given a higher weight than later bids such that they have more effect on the result).

In an exemplary embodiment of the invention, the selection rule is the closest to 50% of the average. In another exemplary embodiment of the invention, the selection rule is the maximum bid below a percentage X (e.g. 10%, 5%, 1%) of the average times the number of bids (X% of the sum of the bids), for example using the numbers in FIG. 3, for X=10 the winner is the closest bid below 32. In a different example the winning bid is the minimum bid above a percentage X (e.g. 90%, 95%, 99%) of the sum of the bids, for example using the numbers in FIG. 3 for X=10 the winner is the closest bid above 288.

In an exemplary embodiment of the invention, the buyers bid a price to be received if they win the auction. In some embodiments of the invention, the buyer requesting to receive the minimum unique price wins the auction. Alternatively or additionally, the buyer requesting to receive the maximum unique price wins the auction. In some embodiments of the invention, the maximum price is the list price of the item. Alternatively, the maximum price is less than the list-price of the item for example less than 10%, 20%, 30%, 40% or 50% of the list price. In some embodiments of the invention, the minimum price is more than 10%, 20%, 30%, 40% or 50% of the list price. In some embodiments of the invention, the winning buyer receives a fixed sum regardless of the buyers bid.

In some embodiments of the invention, the price bid to be received is represented by bidding a negative number to differentiate it from a price to pay. Alternatively the price bid to be received is a positive number since it is known for the auction that the number represents a price to receive.

Figure 4:
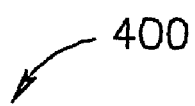
FIG. 4 is a table illustrating an exemplary price bid according to an exemplary embodiment of the invention.

FIG. 4 is a table illustrating an exemplary price bid 400 according to an exemplary embodiment of the invention. FIG. 4 illustrates a bid of 4 potential buyers A, B, C and D. The 4 potential buyers bid a negative number representing the sum they are interested in receiving with the item if they win the auction. In the example in FIG. 4 the lowest unique value (highest negative value) up to the negative of the list price (−235.01 in this example) of the item wins the auction. Buyer A and C both offered the same value, the negative of the list price and are canceled. The winner in this case is D with the next lowest value (−234.25).

In an exemplary embodiment of the invention, the methods above may be used in auctioning items at an auction arena. Optionally, some items may be auctioned using methods known in the art and some items may be offered by methods described above. In an exemplary embodiment of the invention a web site that offers people to sell items, can allow the seller to select a method of auction from the methods described above. In an exemplary method the person can specify a required number of bids, wherein each bidder is required to pay a participation fee (e.g. a dollar). Optionally, a part of the participation fee is given to the seller. In an exemplary embodiment of the invention, each bidder offers a price which will be the average of all the bids. The bidder closest to the correct result wins the item for his or her suggested price. Alternatively the winning bidder receives the item for free and the seller only receives payment from the participation fees.

In some embodiments of the invention, the winning bidder gets back the participation fee. Alternatively or additionally, all the bidders receive purchasing coupons at the price of the participation fee.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of marketing items comprising:
publicizing an on-line auction to sell at least one item;
preselecting a low sum;
preselecting a number;
receiving, at a data processing system, the preselected low sum and the preselected number;
receiving, at the data processing system, a number of price bids for the at least one item, the number of price bids being equal to or greater than said preselected number;
applying, at the data processing system, at least one cancellation rule to selectively cancel zero or more received price bids;
selecting, at the data processing system, one or more remaining price bids closest to said preselected low sum to receive the at least one item; and
outputting, from the data processing system, said one or more price bids closest to said preselected low sum, the number of price bids selected and outputted equaling the number of items publicized to sell;
wherein said preselected low sum is less than 1% of a list price of said item.

2. A method according to claim 1, wherein said price bids are accepted for a fee.

3. A method according to claim 1, wherein said cancellation rule comprises canceling price bids that are not unique.

4. A method according to claim 1, wherein said cancellation rule comprises canceling price bids wherein a number of bidders offering a specific value is greater than a number of units offered of the item.

5. A method according to claim 1, wherein said cancellation rule comprises canceling price bids wherein a number of bidders offering a specific value is not equal to a number of units offered of the item.

6. A method according to claim 1, wherein said preselected low sum is zero.

7. A method according to claim 1, wherein said preselected low sum is less than 0.5% of a list price of the item.

8. A method according to claim 1, wherein said preselected low sum is less than 0.75% of a list price of the item.

9. A method according to claim 1, wherein said preselected low sum is less than 50% of a highest price bid when all of said number of price bids are unique.

10. A method according to claim 1, wherein said one or more price bids closest to said preselected low sum are winning price bids, and wherein said winning price bids receive the item for free.

11. A method according to claim 1, wherein said one or more price bids closest to said preselected low sum are winning price bids, wherein said method further comprises preselecting a price for receiving the item; and wherein said winning price bids pay said preselected price for receiving the item.

* * * * *